US010891922B1

(12) United States Patent
Batra et al.

(10) Patent No.: US 10,891,922 B1
(45) Date of Patent: Jan. 12, 2021

(54) ATTENTION DIVERSION CONTROL

(71) Applicant: Apple Inc., Cupertino, CA (US)

(72) Inventors: Tanmay Batra, Mountain View, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/508,467

(22) Filed: Jul. 11, 2019

Related U.S. Application Data

(60) Provisional application No. 62/699,038, filed on Jul. 17, 2018.

(51) Int. Cl.
*G09G 5/377* (2006.01)
*G06K 9/00* (2006.01)
*G09G 5/14* (2006.01)

(52) U.S. Cl.
CPC ......... *G09G 5/377* (2013.01); *G06K 9/00228* (2013.01); *G06K 9/00335* (2013.01); *G09G 5/14* (2013.01); *G09G 2340/12* (2013.01)

(58) Field of Classification Search
CPC . G09G 5/377; G06K 9/00228; G06K 9/00335
See application file for complete search history.

(56) References Cited

U.S. PATENT DOCUMENTS

| | | | |
|---|---|---|---|
| 9,341,849 B2 | 5/2016 | Wong et al. | |
| 9,690,374 B2 | 6/2017 | Clement et al. | |
| 9,784,972 B2 | 10/2017 | Aratani et al. | |
| 2002/0080173 A1* | 6/2002 | Tagami | A63F 13/12 715/753 |
| 2013/0044130 A1* | 2/2013 | Geisner | G06F 3/002 345/633 |
| 2013/0077820 A1* | 3/2013 | Marais | G06K 9/6257 382/103 |
| 2013/0093788 A1* | 4/2013 | Liu | H04N 5/272 345/633 |
| 2017/0123747 A1 | 5/2017 | Rochford et al. | |
| 2017/0161547 A1* | 6/2017 | Segawa | G06K 9/00362 |
| 2017/0205892 A1* | 7/2017 | Petrovskaya | G02B 27/0101 |
| 2019/0333278 A1* | 10/2019 | Palangie | G06T 7/74 |
| 2019/0342491 A1* | 11/2019 | Mandavilli | H04N 5/23219 |

\* cited by examiner

*Primary Examiner* — Terrell M Robinson
(74) *Attorney, Agent, or Firm* — Thompson Hine LLP

(57) ABSTRACT

In one implementation, a method is disclosed for controlling attention diversions while presenting computer-generated reality (CGR) environments on an electronic device. The method includes presenting content representing a view of CGR environment on a display. While presenting the content, an object is detected in a physical environment in which the electronic device is located using an image sensor of the electronic device. The method further includes determining whether the object exhibits a characteristic indicative of attention-seeking behavior. In accordance with a determination that the object exhibits the characteristic, a visual cue corresponding to the object is presented on a first portion of the display without modifying the presentation of the content on a second portion of the display.

17 Claims, 10 Drawing Sheets

ATTENTION DIVERSION CONTROL

CROSS-REFERENCE TO RELATED APPLICATION

This Application claims the benefit of U.S. Provisional Application Ser. No. 62/699,038 filed Jul. 17, 2018, which is incorporated herein in its entirety.

TECHNICAL FIELD

The present disclosure generally relates to systems, methods, and devices for presenting computer-generated reality (CGR) environments on an electronic device, and in particular, to controlling attention diversions while presenting CGR environments on an electronic device.

BACKGROUND

Various electronic devices exist, such as head-mound devices (also known as headsets and HMDs), with displays that present users with CGR environments. When presented on a display of an electronic device, content associated with a CGR environment may obstruct a view corresponding to at least a subset of the surrounding physical environment. In some instances it may be desirable to inject an obstructed physical object into the CGR environment. Some existing techniques inject obstructed physical objects into a CGR environment based on detected motion or detected motion within a threshold distance of an electronic device. Yet, injecting obstructed physical objects into a CGR environment tends to divert a user's attention. Thus, it may be desirable to provide a means of selectively injecting such objects into CGR environments to avoid any unnecessary attention diversions.

SUMMARY

Various implementations disclosed herein include devices, systems, and methods for controlling attention diversions while presenting CGR environments on an electronic device. In one implementation, a method includes presenting content representing a view of a CGR environment on a display of an electronic device. While presenting the content, an object is detected in a physical environment in which the electronic device is located using an image sensor of the electronic device. The method further includes determining whether the object exhibits a characteristic indicative of attention-seeking behavior. In accordance with a determination that the object exhibits the characteristic, a visual cue corresponding to the object is presented on a first portion of the display without modifying the presentation of the content on a second portion of the display.

In another implementation, a system includes an electronic device with a display, a processor, and a computer-readable storage medium. The computer-readable storage medium comprises instructions that upon execution by the processor cause the system to perform operations. The operations include presenting content representing a view of a CGR environment on the display. While presenting the content, an object is detected in a physical environment in which the electronic device is located using an image sensor of the electronic device. The operations further include determining whether the object exhibits a characteristic indicative of attention-seeking behavior. In accordance with a determination that the object exhibits the characteristic, a visual cue corresponding to the object is presented on a first portion of the display without modifying the presentation of the content on a second portion of the display.

In another implementation, a system includes an electronic device with a display, a processor, and a computer-readable storage medium. The computer-readable storage medium comprises instructions that upon execution by the processor cause the system to perform operations. The operations include presenting content representing a view of a CGR environment on the display. While presenting the content, an object is detected in a physical environment in which the electronic device is located using a sensor of the electronic device. The operations further include determining whether the object exhibits a characteristic indicative of attention-seeking behavior. In accordance with a determination that the object exhibits the characteristic, a visual cue corresponding to the object is presented on a first portion of the display without modifying the presentation of the content on a second portion of the display.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
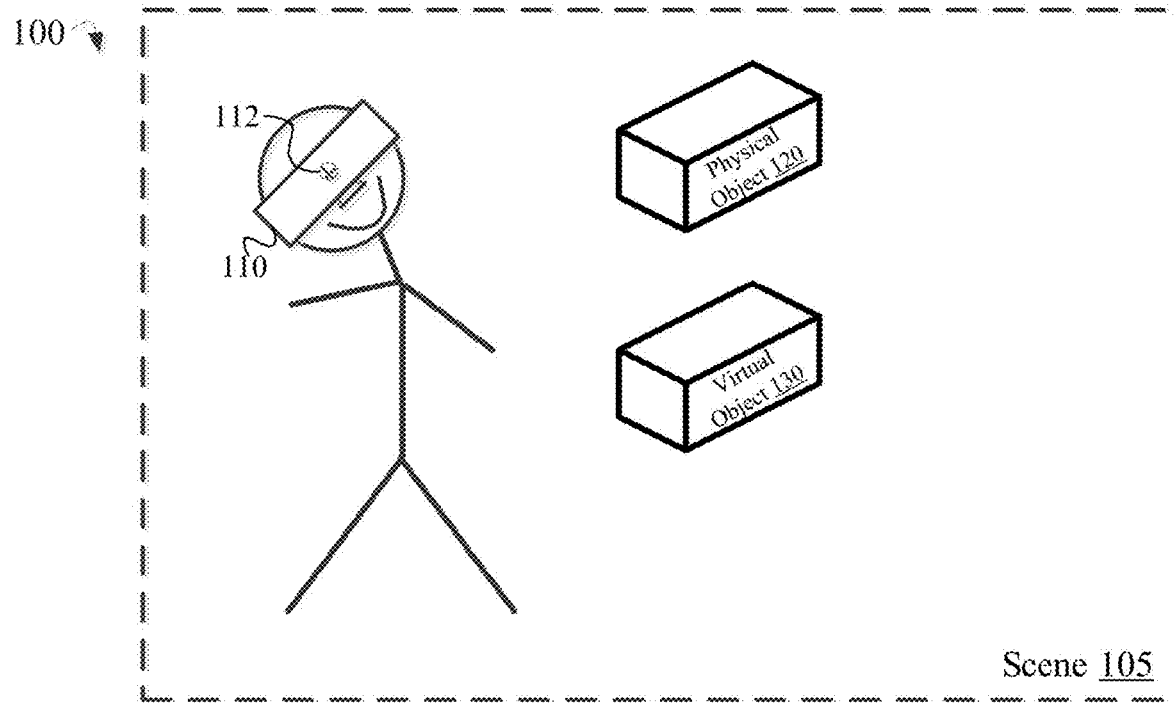
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present disclosure is illustrated and designated generally 100. In general, operating environment 100 illustrates an electronic device 110 configured to present a user with a computer generated reality (CGR) environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic (s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As used herein, "sensory content" or "content" generally refers to attributes or characteristic of an external stimuli in a physical environment that is perceivable by one or more sensory organs of a user. Examples of "sensory content" or "content" include auditory content, visual content, tactile content, olfactory content, gustatory content, or combinations thereof.

"Sensory content" or "content" may be distinguishable on the basis of where it originates. For example, natural/physical sensory content may originate from a physical (real-world) environment proximate to electronic device 110 (e.g., scene 105). As such, physical sensory content is perceivable by a user with or without electronic device 110. In contrast, virtual sensory content refers to sensory content that is generated or at least processed by a computing device (e.g., electronic device 110). Virtual sensory content may include two-dimensional ("2D") or three-dimensional ("3D") graphical/image content, sounds, tactile feedback, and the like, which is generated or at least processed by a computing device. As such, virtual sensory content is not perceivable by a user without a computing device.

Electronic device 110 is shown as a head-mounted device ("HMD") in the example depicted by FIG. 1. Those skilled in the art will recognize that an HMD is but one form factor that is suitable for implementing electronic device 110. Other form factors that are suitable for implementing electronic device 110 include smartphones, AR glasses, smart glasses, desktop computers, laptops, tablets, computing devices, and the like. In some implementations, electronic device 110 includes a suitable combination of software, firmware, or hardware.

For example, electronic device 110 may include image sensor 112 and an output device (e.g., display 1108 of FIG. 11). Examples of suitable devices for implementing the output device include a display, an audio speaker, a haptic device, and the like. In one implementation, electronic device 110 includes an output device disposed on an inward facing surface of electronic device 110.

Image sensor 112 is configured to obtain image data corresponding to a scene or physical environment (e.g., scene 105) in which electronic device 110 is located. In one implementation, image sensor 112 is part of an array of image sensors configured to capture light field images corresponding to a physical environment (e.g., scene 105) in which electronic device 110 is located. In one implementation, image sensor 112 is a component of a depth camera.

Some implementations describe virtual sensory content and physical sensory content in terms of visual sensory content. However, implementations are not limited to visual sensory content, but rather may include any type of sensory content described above with respect to FIG. 1 when an electronic device includes appropriate sensors and output devices. For example, aspects of the present disclosure are equally applicable to auditory content when an electronic device includes appropriate sensors and output devices, such as a microphone and speaker, respectively.

Figure 2:
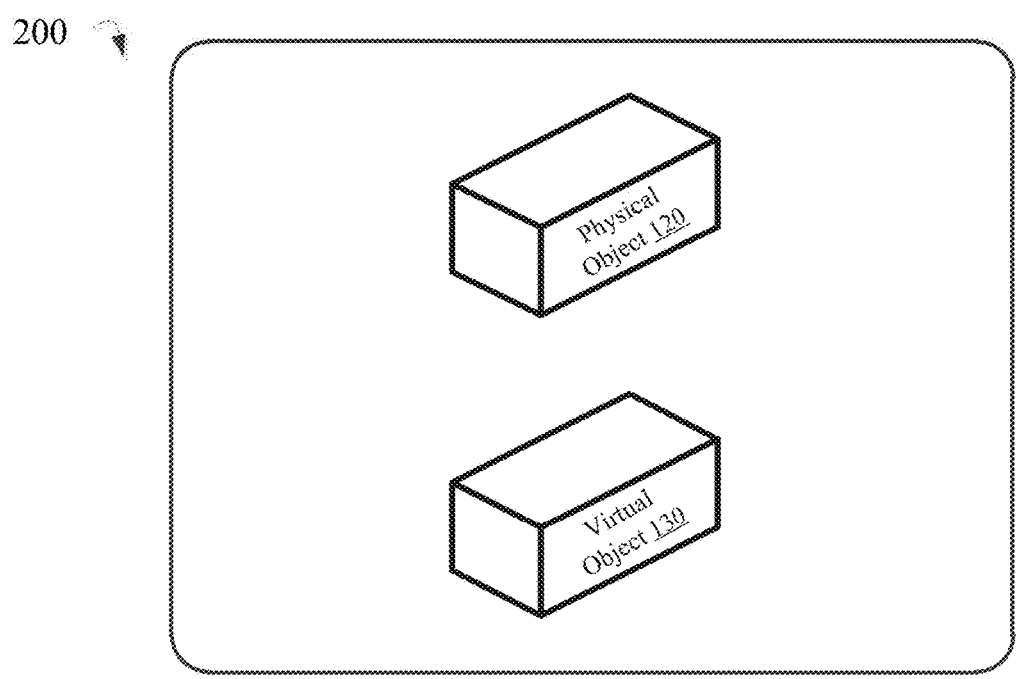
FIG. 2 illustrates an example of presenting content representing a view of a CGR environment on a display of an electronic device while the electronic device is located in a physical environment associated with the operating environment illustrated in FIG. 1.

FIG. 2 is an example of presenting content 200 representing a CGR environment on a display of electronic device 110. Content 200 generally corresponds to a view of the CGR environment that a user of electronic device 110 may perceive before electronic device 110 selectively injects visual cues corresponding to an object into the CGR environment, as described in greater detail below. Absent any such visual cues being selectively injected into the CGR environment, content 200 includes physical content obtained using an image sensor (e.g., image sensor 112 of FIG. 1) that depicts physical object 120 and virtual content corresponding to virtual object 130. In one implementation, content 200 only includes physical content (e.g., physical content depicting physical object 120). In one implementation, content 200 only includes virtual content (e.g., virtual content depicting virtual object 130).

Figure 3:
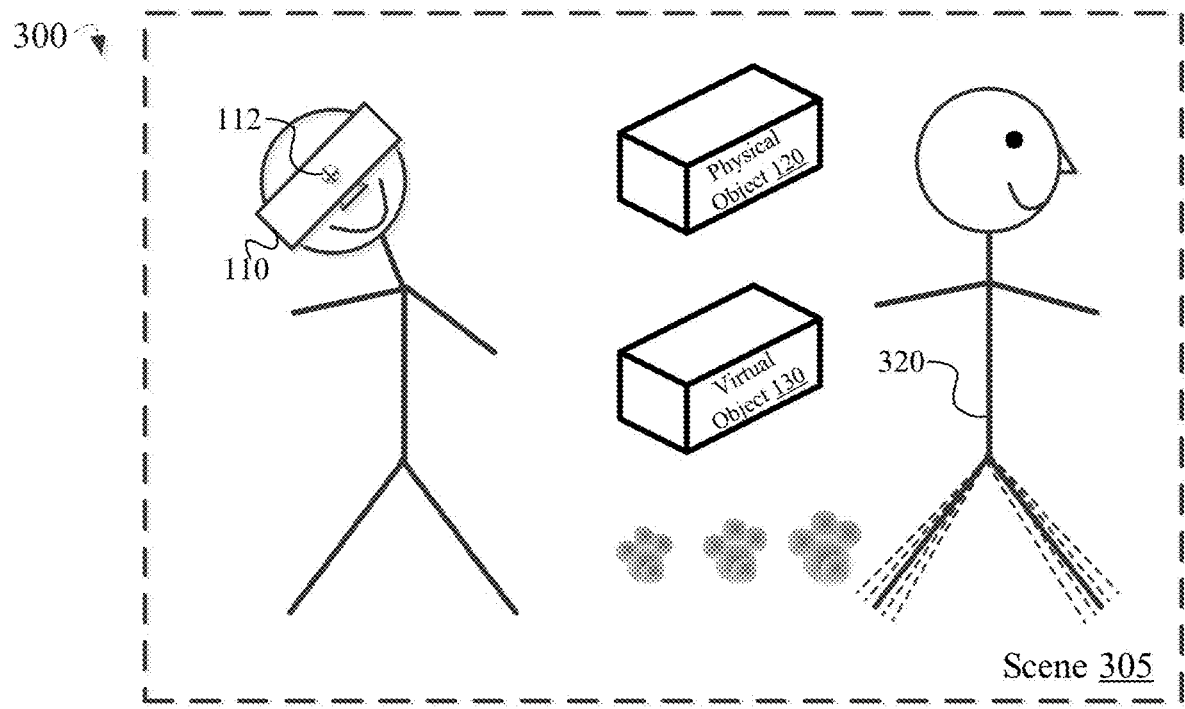
FIG. 3 is a block diagram of the example operating environment illustrated in FIG. 1 when an object is detected in the associated physical environment.
Figure 5:
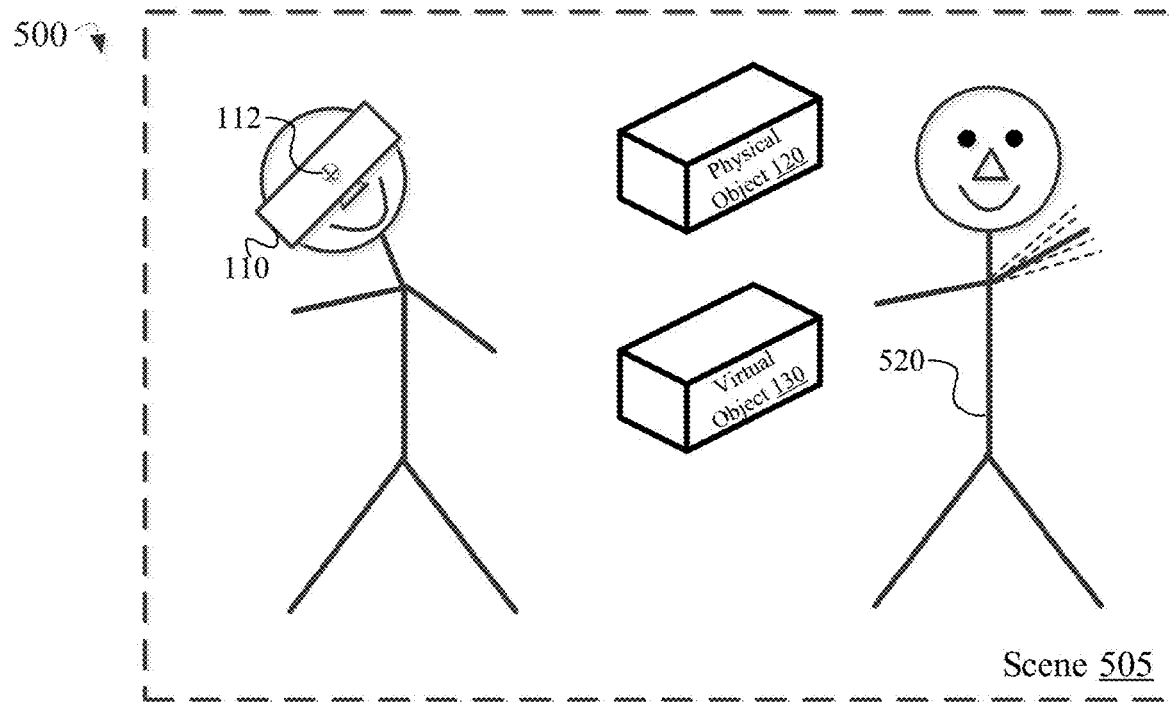
FIG. 5 is another block diagram of the example operating environment illustrated in FIG. 1 when an object is detected in the associated physical environment.
Figure 6:
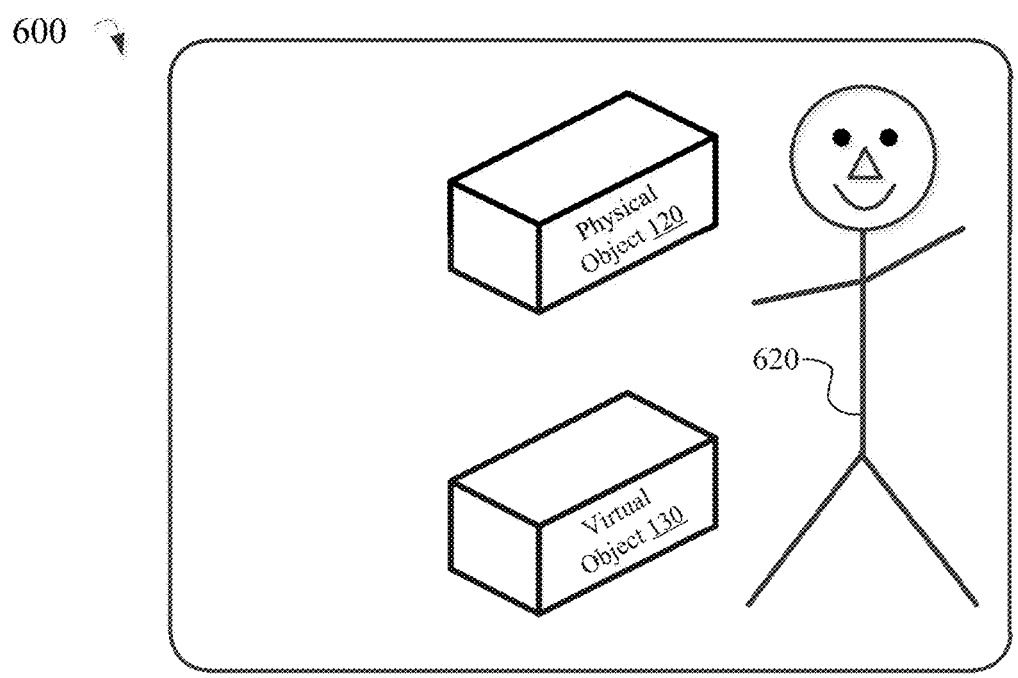
FIGS. 6-9 each illustrate an example of presenting a visual cue corresponding to the detected object of FIG. 5 concurrently with the content illustrated in FIG. 2 in accordance with a determination that the detected object exhibits a characteristic indicative of attention-seeking behavior.
Figure 7:
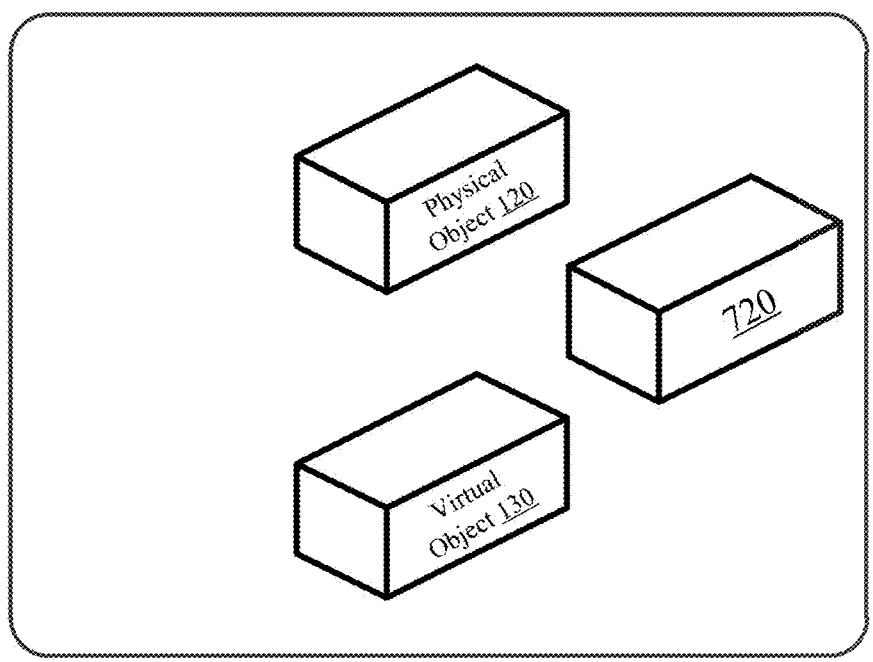
Figure 8:
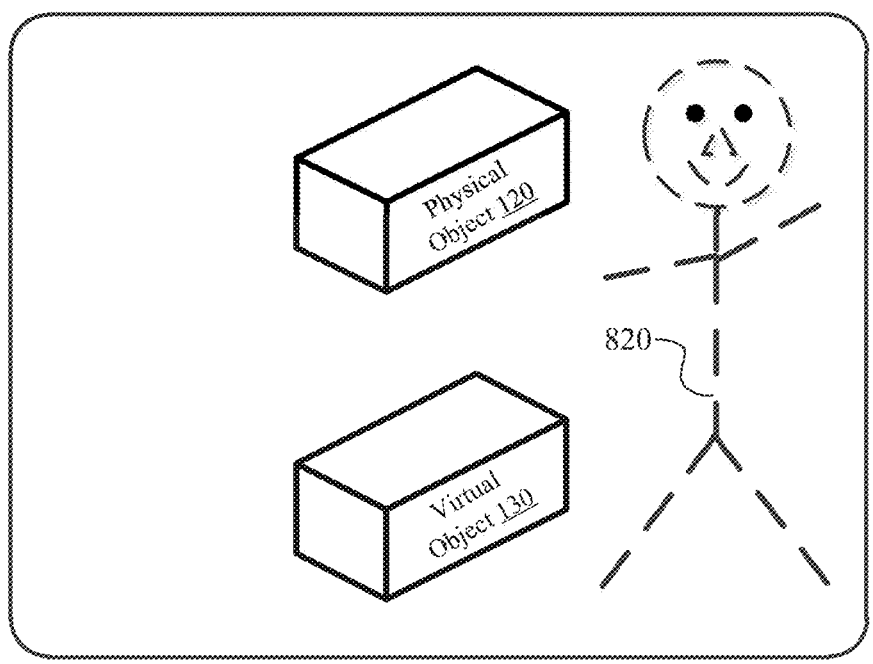

While presenting content 200, electronic device 110 may detect an object in a physical environment proximate to electronic device 110 using an image sensor (e.g., image sensor 112 of FIG. 1) of electronic device 110. FIGS. 3 and 5 each illustrate an example operating environment in which electronic device 110 detected an object in a physical environment proximate to electronic device 110 while presenting content 200. Specifically, while presenting content 200, electronic device 110 detected object 320 in operating environment 300 of FIG. 3 and object 520 of FIG. 5. In FIGS. 3 and 5, detected objects 320 and 520 may be positioned within the proximate physical environment (e.g., scenes 305 and 505, respectively) such that physical content depicting physical object 120 and the virtual content depicting virtual object 130 obstructs a user's view of those detected objects.

Those of ordinary skill in the art will appreciate that electronic device 110 may detect the object in the physical environment using other types of sensors. In some implementations, the object may be detected using sensors that generate data characterizing other types of external stimuli in a physical environment, such as auditory data, tactile data, olfactory data, gustatory data, or combinations thereof. For example, electronic device 110 may detect an object based on auditory data obtained using a sensor that satisfies an audible criterion defined by a phrase, a word, an intonation range, a volume threshold, and the like. In an implementation, the audible criterion is obtained from a user of electronic device 110 via a user interface. As another example, detecting the object may involve identifying a new auditory source proximate to electronic device 110 that was previously absent in auditory data obtained using a sensor of electronic device 110.

As discussed above, some existing techniques inject obstructed physical objects into a CGR environment based on detected motion or detected motion within a threshold distance of an electronic device regardless of the object or its characteristics. In contrast, implementations disclosed herein selectively provide cues of such object, e.g., based on determining whether the objects exhibit certain characteristics.

Figure 4:
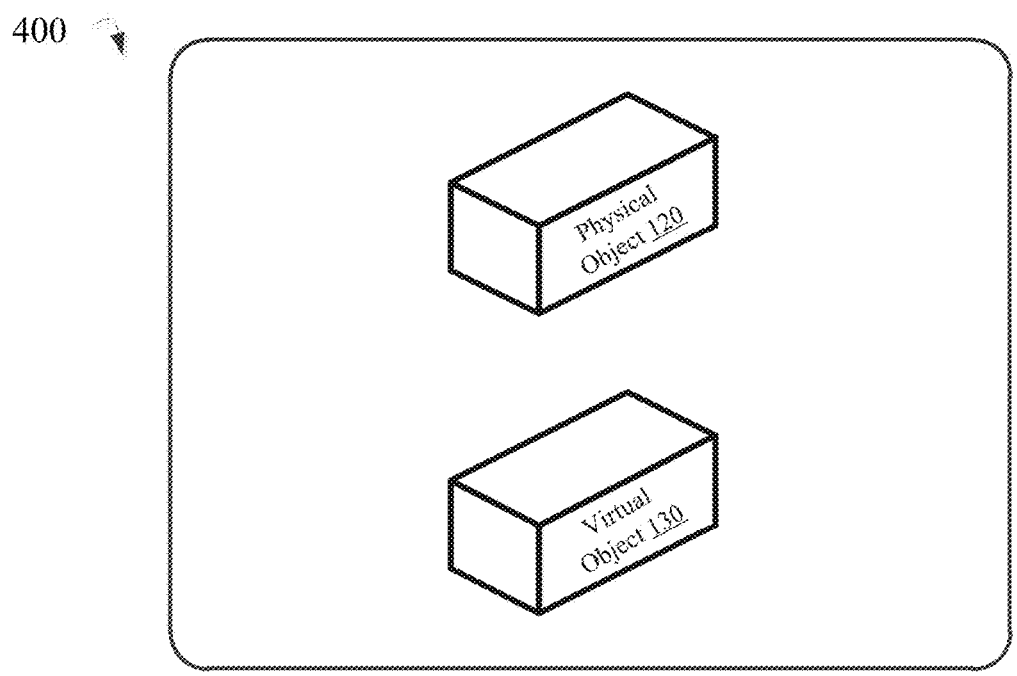
FIG. 4 illustrates an example of refraining from presenting a visual cue corresponding to the detected object of FIG. 3 concurrently with the content illustrated in FIG. 2 in accordance with a determination that the detected object does not exhibit a characteristic indicative of attention-seeking behavior.

In some implementations, the CGR environment represented by content 200 remains unchanged when electronic device 110 detects object 320. In particular, a comparison between FIGS. 2 and 4 illustrates that a view of the CGR environment before and after electronic device 110 detects object 320 (represented by content 200 and content 400, respectively) remains unchanged. Similar to content 200 of FIG. 2, content 400 includes physical content depicting physical object 120 and virtual content corresponding to virtual object 130. Absent in content 400 is any visual cue corresponding to object 320.

In contrast, the CGR environment represented by content 200 changes when electronic device 110 detects object 520, as illustrated by comparing FIG. 2 with any of FIGS. 6-9. Unlike content 200 of FIG. 2, FIGS. 6-9 each depict content that includes a visual cue corresponding to object 520. Electronic device 110 injects the visual cue corresponding to object 520 into the CGR environment in accordance with a determination that object 520 exhibits a characteristic indicative of attention-seeking behavior.

As used herein, a characteristic indicative of attention-seeking behavior generally refers to any behavior exhibited by an object in a physical environment or action performed by the object that suggests that the object is seeking the attention of a user of electronic device 110. Stated differently, an object in a physical environment that exhibits a characteristic indicative of attention-seeking behavior is more likely attempting to garner the attention of a user of electronic device 110 than an object that does not exhibit that characteristic. A comparison between FIGS. 3 and 5 illustrates this distinction.

For example, FIG. 3 depicts object 320 as a person passing through scene 305 while electronic device 110 presents the CGR environment to a user. The person passing through scene 305 may represent a house guest or co-worker of the user. In FIG. 3, the person (e.g., object 320) appears to pass within close proximity to electronic device 110 while passing through scene 305. Yet, that person may be unaware of the user's presence in scene 305, and therefore it is unlikely that the person is attempting to garner the user's attention. As illustrated in FIG. 4, electronic device 110 refrains from injecting any visual cue associated with that person into content 400 that represents the CGR environment after electronic device 110 detects object 320. In doing so, electronic device 110 mitigates any potentially unnecessary attention diversions into that CGR environment.

FIG. 5 depicts object 520 as a person waving while electronic device 110 presents the CGR environment to a user in scene 505. The person waving in scene 505 may represent a child or spouse of the user. Similar to the person represented by object 320 in FIG. 3, the person represented by object 520 in FIG. 5 appears to be within close proximity to electronic device 110. Unlike the person in FIG. 3, the person represented by object 520 in FIG. 5 appears to be waving in a general direction of the user in scene 520. The waving gesture exhibited by the person represented by object 520 suggests that this person is seeking the attention of the user of electronic device 110. Thus, in accordance with a determination that the person (e.g., object 520) exhibits a characteristic indicative of attention-seeking behavior (e.g., the waving gesture in the example of FIG. 5), electronic device 10 presents a visual cue corresponding to that person. As seen in FIGS. 6-9, that visual cue is presented on a first portion of the display without modifying the presentation of the content on a second portion of the display. For example, in FIGS. 6-9, a visual cue (e.g., visual cues 620, 720, 820, and 920) is presented on a first portion of the display without modifying the presentation of the content associated with physical object 120 and virtual object 130 on the second portion of the display.

In one implementation, determining whether an object exhibits a characteristic indicative of attention-seeking behavior involves applying image data depicting the object as input to a model (e.g., attention-seeking model 1140 of FIG. 11). In one implementation, the image data is obtained using an image sensor (e.g., image sensor 112 of FIG. 1) of electronic device 110. In one implementation, the model is trained using a set of training images depicting particular instances of attention-seeking behavior. For example, the training images may depict particular poses, gestures, facial expressions, and the like that when exhibited by an object in a physical environment or performed by the object suggests that the object is seeking the attention of a user of electronic device 110. That is, an object in a physical environment that exhibits at least one of the particular poses, gestures, facial expressions, and the like that are depicted in the training images is more likely attempting to garner the attention of a user of electronic device 110 than an object that does not.

In one implementation, the model is trained with the set of training images using a machine learning process. In one implementation, the machine learning process employs a supervised learning technique. As understood by one skilled in the art, supervised learning techniques are machine learning processes in which a computing device identifies rules (or functions) that map example inputs (e.g., a set of labeled training images) with desired outputs (e.g., context labels for each labeled training image). Examples of suitable supervised learning techniques for this implementation include: linear regression, logistic regression, neural networks, support vector machines, naïve bayes, random forest, classification trees, and the like.

In one implementation, the machine learning process employs an unsupervised learning technique. As understood by one skilled in the art, unsupervised learning techniques are machine learning processes in which a computing device identifies a structure (e.g., recognizes a pattern) in example inputs (e.g., a set of unlabeled training images). Examples of suitable unsupervised learning techniques for this implementation include: clustering techniques (e.g., K-means, hierarchical clustering, mixture models, etc.), dimensionality reduction techniques (e.g., principal component analysis, independent component analysis, autoencoder, etc.), and the like.

In one implementation, at least a subset of the set of training images is generated by a user of electronic device 110. In one implementation, that subset of the set of training images is generated by the user using an image sensor of electronic device 110. In one implementation, that subset of the set of training images is generated by the user using an image sensor external to electronic device 110. Training a model using a set composed, at least in part, of user-generated training images may facilitate configuring electronic device 110 to identify characteristics indicative of attention-seeking behavior that are customized for particular users. In one implementation, the user-generated training images provide feedback for fine-tuning of a model trained using non-user generated training images.

In one implementation, the model is trained using a set of non-visual training data representing particular instances of non-visual attention-seeking behavior. Examples of non-visual attention-seeking behavior include specific audible sounds (e.g., whistling or finger snapping), specific phrases (e.g., "excuse me" or "hey [user's name]"), and the like that indicate an object is attempting to garner the attention of a user of electronic device 110. In one implementation, at least a subset of the non-visual training data is generated by a user of electronic device 110. In one implementation, the subset of the non-visual training data includes a negative example of non-visual sensory content that facilitates configuring electronic device 110 to ignore specific instances of non-visual sensory content. In one implementation, the subset of the non-visual training data is obtained using a non-visual sensor of electronic device 110. In one implementation, the non-visual sensor is configured to output data indicative of non-visual sensory content corresponding to a physical environment proximate to electronic device 110. Examples of non-visual sensory content include: auditory content, tactile content, olfactory content, and gustatory content.

In one implementation, determining whether an object exhibits a characteristic indicative of attention-seeking behavior involves evaluating image data depicting the object against pre-defined criteria for attention-seeking behavior. Examples of such pre-defined criteria include: parameters associated with a specific pose, parameters associated with a specific gesture, parameters associated with a specific facial expression, an identity of an object, a position of an object in a physical environment, and the like. In one implementation, the pre-defined criteria is obtained from a user of electronic device 110. By way of example, the user may have a pet dog that regularly retrieves its leash and sits by a front door of the user's house whenever it wishes to go outside for various reasons. In this example, the pre-defined criteria obtained from the user may include a first criterion that evaluates whether a detected object is the pet dog, a second criterion that evaluates whether a detected object is holding the leash, and a third criterion that evaluates whether a detected object is located in proximity to the front door.

In one implementation, determining whether an object exhibits a characteristic indicative of attention-seeking behavior involves applying image data depicting the object as input to a gesture recognition process, a pose recognition process, a facial recognition process, or combinations thereof. In one implementation, one or more of the gesture recognition process, the pose recognition process, and the facial recognition process is executing in a runtime environment provided by electronic device 110. For example, CGR experience module 1440 of FIG. 14 may be configured to obtain image data depicting an object from image sensor systems 1406 and direct that image data to machine vision unit 1446. In response to receiving that image data, machine vision unit 1446 may be configured to effectuate one or more of the gesture recognition process, the pose recognition process, and the facial recognition process for processing such image data using computing resources provided by processor(s) 1402 and memory 1420.

FIGS. 6-9 depict examples of presenting a visual cue on a first portion of a display that corresponds to an object exhibiting a characteristic indicative of attention-seeking behavior without modifying content (e.g., content 600, 700, 800, and 900, respectively) representing a CGR environment that is presented on a second portion of the display of electronic device 110. FIGS. 6-9 depict various types of visual cues that an CGR presentation unit (e.g., CGR presentation unit 1444 of FIG. 14) of electronic device 110 may inject into such content after electronic device 110 detects object 520 and determines that object 520 exhibits a characteristic indicative of attention-seeking behavior.

One type of visual cue is represented by visual cue 620 that the CGR presentation unit of electronic device 110 injected into content 600. Visual cue 620 is an image (or sequence of images) of object 520 that is obtained from an image sensor (e.g., image sensor 112 of FIG. 1) of electronic device 110. In one implementation, visual cue 620 may be described as pass-through video of object 520. Another type of visual cue is represented by visual cue 720 that the CGR presentation unit injected into content 700. Visual cue 720 is a virtual object that the CGR presentation unit positioned in the CGR environment to substantially or fully align with a position of object 520 in the physical environment relative to electronic device 110. In one implementation, the CGR presentation unit may select the virtual object from a library of virtual objects that complement the CGR environment being presented to a user. Continuing with the example above in which the CGR environment corresponds to a pre-historic world, the CGR presentation unit may select a virtual object representing a dinosaur for visual cue 720. Yet another type of visual cue is represented by visual cue 820 that the CGR presentation unit injected into content 800.

Visual cue 820 is a wireframe representation of object 520 that represents peripheral boundaries of object 520.

Figure 9:
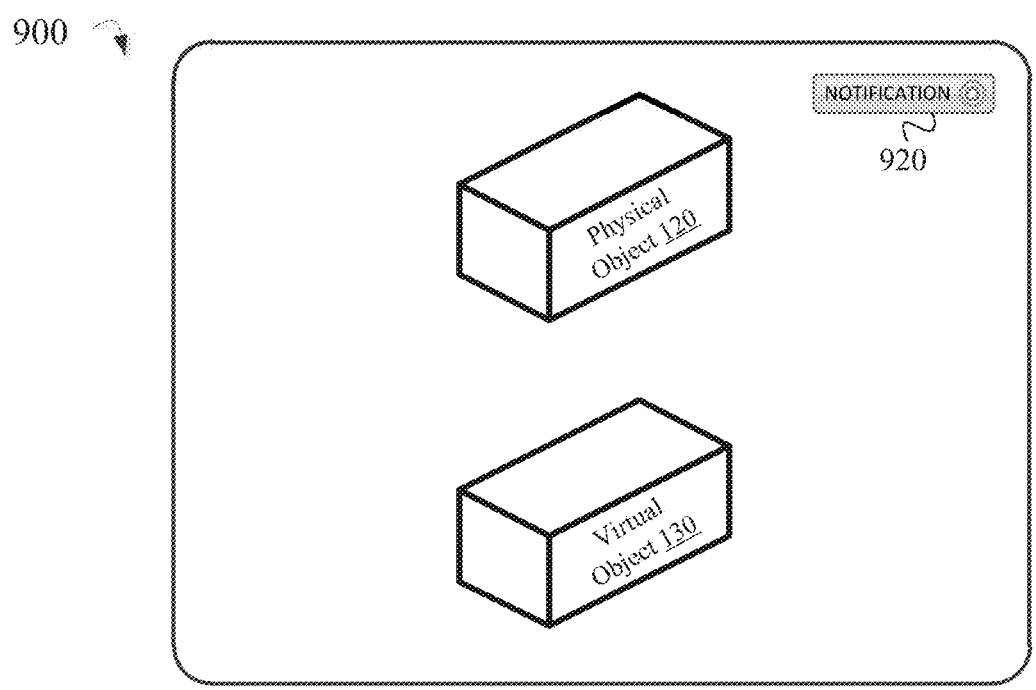

Another type of visual cue is represented by visual cue 920 that the CGR presentation unit injected into content 900. Visual cue 920 is a user interface element overlaying at least a subset of content 900 on the display of electronic device 110. In FIG. 9, visual cue 920 is depicted as comprising text and a software interface element. The CGR presentation unit may populate the text of visual cue 920 with information regarding object 520. For example, the text may be populated with information pertaining to: an identity of object 520, the characteristic indicative of attention-seeking behavior exhibited by object 520, a speech-to-text transcription of audio data associated with object 520, a position of object 520 in the physical environment, an estimation of how long object 520 has exhibited the characteristic, an estimation of how long object 520 has been within a threshold proximity of electronic device 110, and the like. The software interface element of visual cue 920 is operative (when activated or selected by a user) to overlay a subset of content 900 with image data (e.g., visual cue 620 of FIG. 6) depicting object 520 that is obtained from an image sensor of electronic device 110.

In some implementations, presenting visual cues corresponding to objects exhibiting a characteristic indicative of attention-seeking behavior is affected by a priority list or an exclusion list. For example, a priority (or white) list or an exclusion (or black) list may assist users of electronic device 110 with assigning different classifications to objects. A user may identify specific objects or people (e.g., the user's children) on a priority list for preferential treatment. Using the priority list, electronic device 110 may automatically inject a visual representation of such objects (or people) into a CGR environment presented to the user. Also, a user may identify specific objects or people (e.g., the user's in-law's) on an exclusion list for less than preferential treatment. Using the exclusion list, electronic device 110 may refrain from injecting any visual representations of such objects (or people) into an CGR environment presented to the user.

In one implementation, electronic device 110 overrides an exclusion list upon determining that an object identified on the exclusion list satisfies a criteria for immediate display using an image sensor of electronic device 110. In one implementation, electronic device 110 overrides the exclusion list by automatically presenting an image of the excluded object on a first portion of the display without modifying the content presented on a second portion of the display. In one implementation, the image of the excluded object is presented on the first portion of the display prior to presenting the visual cue. In one implementation, the image of the excluded object is obtained using an image sensor of electronic device 110.

In one implementation, a priority list or an exclusion list is associated with an activation state that determines whether presenting a visual cue corresponding to an object concurrently with content representing a CGR environment is affected by the priority list or the exclusion list. In one implementation, presenting the visual cue concurrently with the content is unaffected by the priority list or the exclusion list when the activation state is inactive. In one implementation, presenting the visual cue concurrently with the content is affected by the priority list or the exclusion list when the activation state is set to active. In one implementation, the activation state is set to inactive in accordance with a determination that a current position of the electronic device in a physical environment satisfies a geographic restriction associated with a priority list or an exclusion list.

In some implementations, electronic device 110 presents content representing a view of a CGR environment that is being exclusively presented on a display of electronic device 110. In these implementations, the CGR environment is known as a personal CGR environment. In other implementations, electronic device 110 presents content representing view of a CGR environment that is being concurrently presented to at least one other user on a display external to electronic device 110. In these implementations, the CGR environment is known as a shared CGR environment. The shared CGR environment may be associated with an on-going conferencing session between multiple users, a multiplayer online game, and the like.

FIGS. 10A-12C illustrate examples of controlling attention diversions while presenting content associated with a shared CGR environment concurrently to multiple users. As part of the shared CGR environment, content 1000A representing a first view of the shared CGR environment is presented on a display of electronic device 110 to a first user while content 1000B representing a second view of the shared CGR environment and content 1000C representing a third view of the shared CGR environment are concurrently presented to a second and third user, respectively.

Figure 10A:
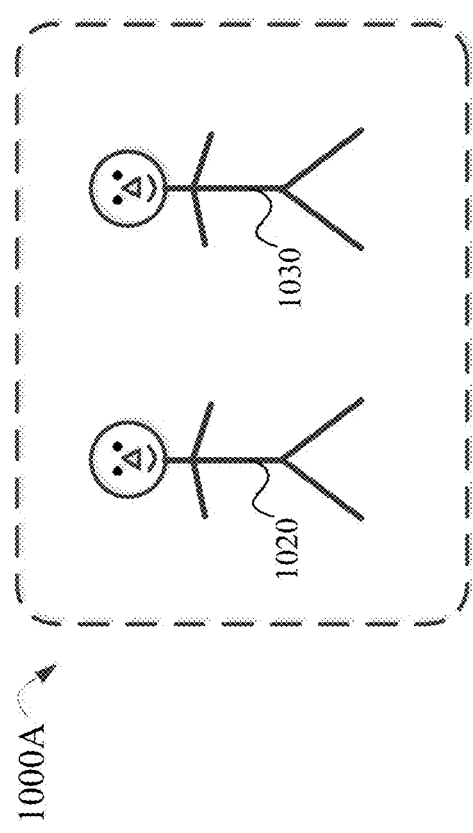
FIGS. 10A-10C illustrate examples of presenting content on representing views of a shared CGR environment on multiple displays.
Figure 10C:
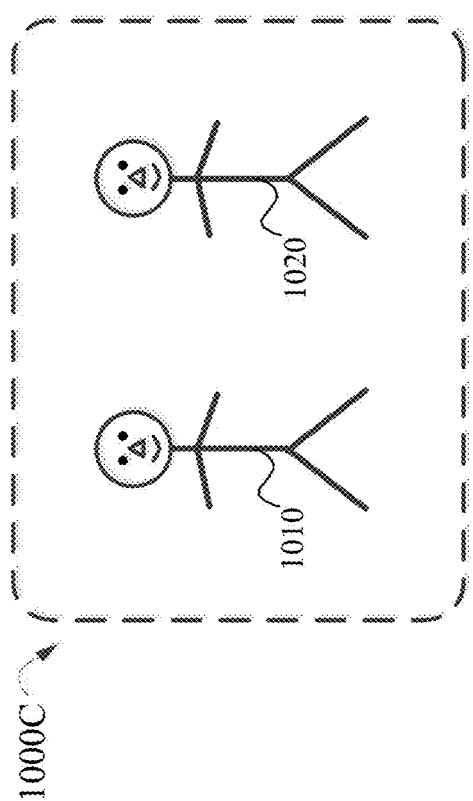
Figure 10B:
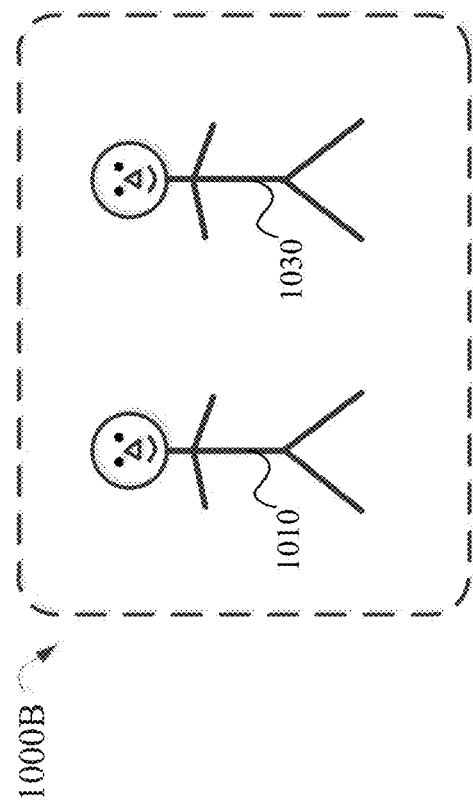

FIGS. 10A-10C show that each user is presented with content that includes visual representations of the other users participating in the shared CGR environment. For example, content 1000A, which is presented to the first user, includes visual representations 1020 and 1030 that represent the second and third users, respectively. In FIG. 10B, content 1000B, which is presented to the second user, includes visual representations 1010 and 1030 that represent the first and third users, respectively. In FIG. 10C, content 1000C, which is presented to the third user, includes visual representations 1010 and 1020 that represent the first and second users, respectively.

While content 1000A on the display, electronic device 110 may detect an object in a physical environment in which electronic device 110 is located using an image sensor. For example, the object that electronic device 110 detects may be a friend of the first user with an urgent matter to discuss. In accordance with a determination that the object exhibits a characteristic indicative of attention-seeking behavior, a visual cue corresponding to the object is presented on a first portion of the display without modifying content 1000A that is presented on a second portion of the display.

Figure 11A:
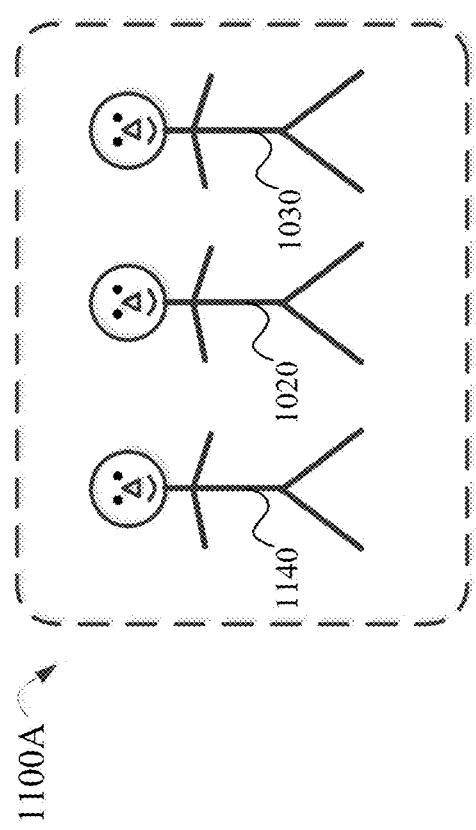
FIGS. 11A-11C illustrate examples of presenting, on one of the multiple displays illustrated in FIGS. 10A-10C, a visual representation of an object that exhibits a characteristic indicative of attention-seeking behavior concurrently with the content while excluding the visual representation from presentation on the other displays.

That visual cue is represented in FIG. 11A by visual cue 1140, which a CGR presentation unit (e.g., CGR presentation unit 1444 of FIG. 14) of electronic device 110 injected into content 1100A. Visual cue 1140 is an image (or sequence of images) of the object that is obtained from an image sensor (e.g., image sensor 112 of FIG. 1) of electronic device 110. While visual cue 1140 is shown as an image of the object in FIG. 11A, one skilled in the art will appreciate that any of the visual cues discussed above may be used. For example, visual cue 1140 may also be implemented as a user interface element (e.g., visual cue 920 of FIG. 9) overlaying content 1100A on the display.

Figure 11B:
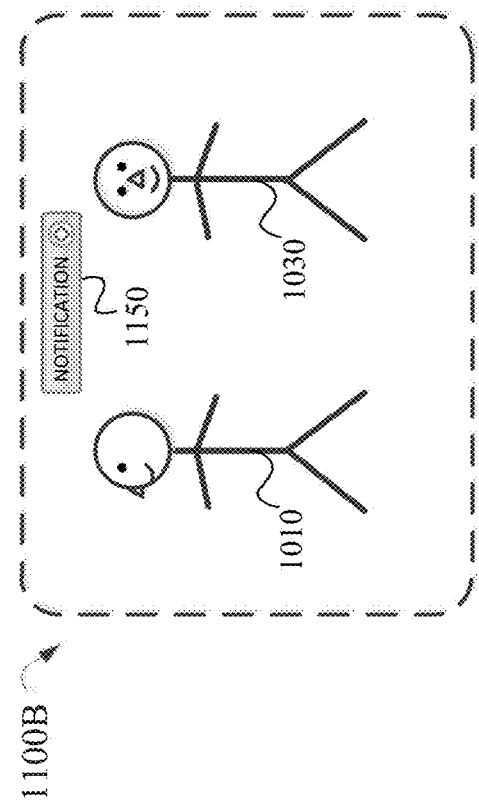
Figure 11C:
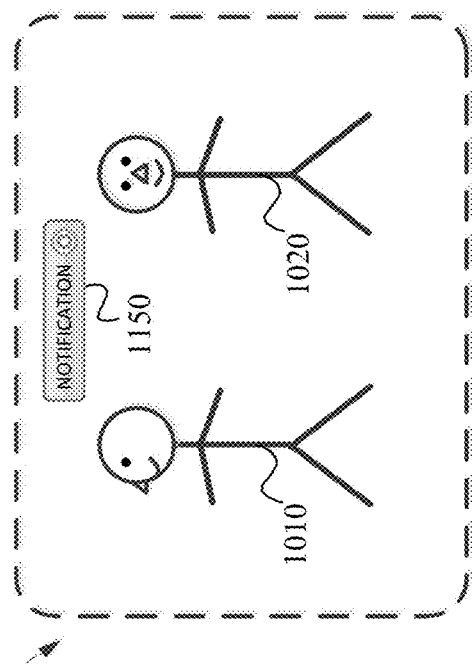

In one implementation, the user interface element may seek approval from the first user to present a visual representation of the object (e.g., visual cue 620 of FIG. 6) on the display while excluding the visual representation from the shared CGR environment. FIGS. 11A-11C provide an example of how each user's respective view of the shared CGR environment may appear after electronic device 110 receives input data via the user interface element that indicates the first user has granted such approval. In the example of FIG. 11A, the first user is presented with content including visual cue 1140. However FIGS. 11B and 11C illustrate that content 1100B and 1100C (presented to the second and third user, respectively) lack any visual representation of the object detected by electronic device 110. As such, the first user may divert his attention towards the visual representation of the object (e.g., visual cue 1140) while the second and third users are left wondering what has garnered the attention of the first user. In one implementation, presenting visual cue 1140 on the display of electronic device 110 causes the display associated with the second and third users to present an indication that the view of the shared CGR environment presented to the first user has entered an external interruption state. In FIGS. 11B and 11C, that indication is represented by visual cue 1150. Presenting these indications may avoid any such confusion.

Figure 12A:
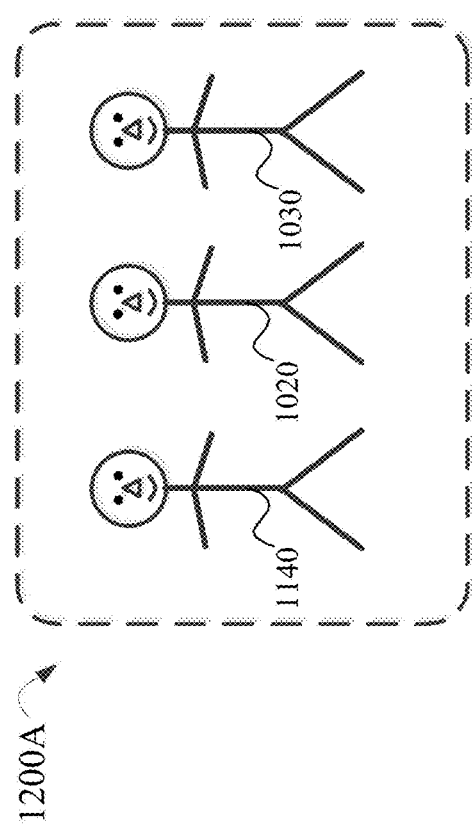
FIGS. 12A-12C illustrate examples of presenting a visual representation of an object that exhibits a characteristic indicative of attention-seeking behavior concurrently with the content on each of the multiple displays illustrated in FIGS. 10A-10C.
Figure 12C:
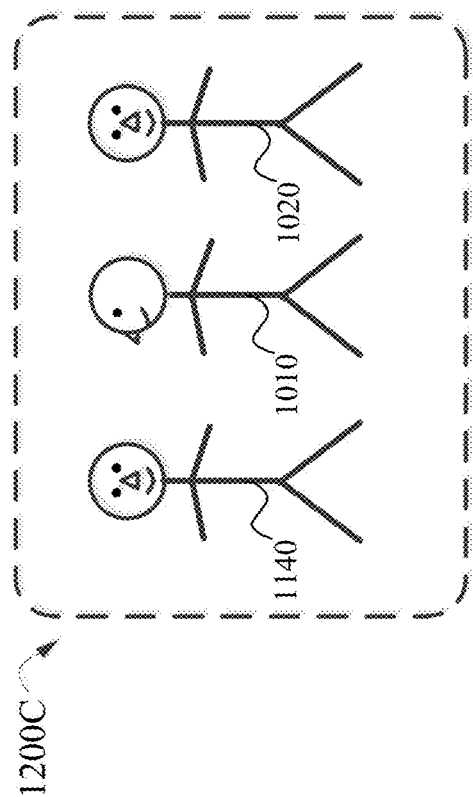
Figure 12B:
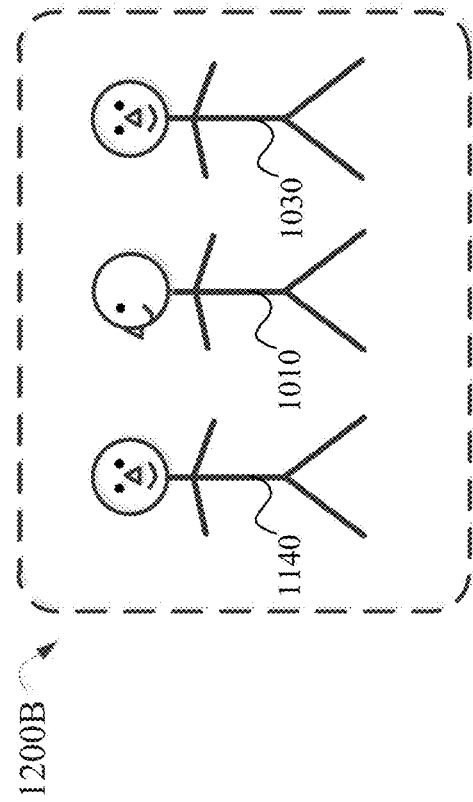

In one implementation, the user interface element may seek approval from the first user to present a visual representation of the object (e.g., visual cue 620 of FIG. 6) in the shared CGR environment. FIGS. 12A-12C provide an example of how each user's respective view of the shared CGR environment may appear after electronic device 110 receives input data via the user interface element that indicates the first user has granted such approval. In particular, content 1200A, content 1200B, and content 1200C (presented to the first, second, and third users, respectively) each include visual cue 1140 corresponding to the visual representation of the object.

In one implementation, a non-visual cue corresponding to an object is provided to a user associated with a shared CGR environment in accordance with a determination that the object exhibits a characteristic indicative of attention-seeking behavior. For example, electronic device 110 may provide the first user with an audible cue that conveys information about the object. In one implementation, a visual cue corresponding to an object is provided to a user associated with a shared CGR environment in accordance with a determination that the object exhibits a characteristic indicative of attention-seeking behavior. For example, electronic device 110 may provide the first user with an visual cue (e.g., textual message) that conveys information about the object. In one implementation, a user of electronic device 110 customizes at least one attribute of a non-visual cue corresponding to an object, a visual cue corresponding to an object, or a visual representation of an object.

Figure 13:
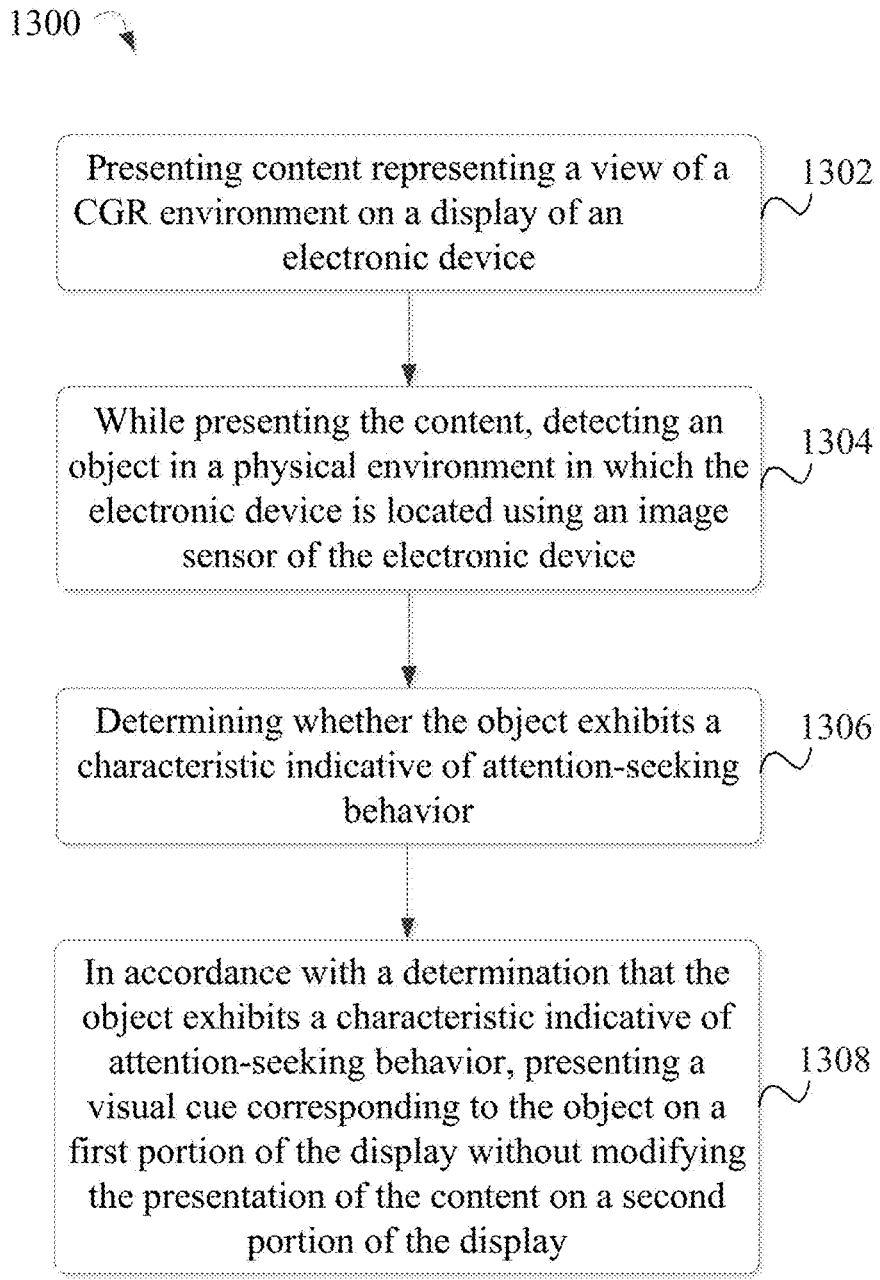
FIG. 13 is a flow-chart illustrating an example of a method controlling attention diversions while presenting CGR envrionments on a display of an electronic device.

FIG. 13 is a flow-chart illustrating an example of a method 1300 for controlling attention diversions while presenting computer generated reality (CGR) experiences. At block 1302, method 1300 includes presenting content representing a view of a CGR environment on a display of an electronic device. At block 1304, method 1300 includes detecting an object in a physical environment in which the electronic device is located using an image sensor of the electronic device while presenting the content. In one implementation, detecting the object in the physical environment causes the sensor to transition from a power saving mode to a standard operating mode. In one implementation, the sensor provides sensor data at a lower sampling rate when operating in the power saving mode than when operating in the standard operating mode.

At block 1306, method 1300 includes determining whether the object exhibits a characteristic indicative of attention-seeking behavior. In one implementation, determining whether the object exhibits the characteristic involves applying image data depicting the object as input to a model (e.g., attention-seeking model 1442 of FIG. 14) trained using a set of training images depicting particular instances of attention-seeking behavior. In one implementation, determining whether the object exhibits the characteristic involves evaluating image data depicting the object against pre-defined criteria for attention-seeking behavior. In one implementation, determining whether the object exhibits the characteristic involves applying image data depicting the object as input to a gesture recognition process, a pose recognition process, a facial recognition process, or a combination thereof. At block 1308, method 1300 includes presenting a visual cue corresponding to the object on a first portion of the display without modifying the presentation of the content on a second portion of the display in accordance with a determination that the object exhibits the characteristic.

In one implementation, method 1300 further comprises determining that an object represents a threat to user safety using an image sensor of electronic device 110. In one implementation, an image of the object is automatically presented on a first portion of a display of electronic device 110 without modifying content representing a view of a CGR environment on a second portion of the display. In one implementation, the image of the object is presented prior to presenting a visual cue corresponding to the object on the display. In one implementation, the image of the object is obtained using the image sensor.

In one implementation, method 1300 further comprises determining an identity of the object using image data depicting the object prior to presenting the visual cue. In one implementation, the image data is obtained using an image sensor of the electronic device. In one implementation, the image data is obtained using an image sensor external to the electronic device.

In one implementation, the identity of the object is evaluated against a priority list. In one implementation, presenting the visual cue corresponding to the object is performed automatically in accordance with a determination that the identity of the object is included on the priority list. In one implementation, a user interface element overlaying the content is presented on the display seeking approval from a user to present the visual cue on the display, in accordance with a determination that the identity of the object is absent from the priority list. In one implementation, the visual cue corresponding to the object is presented further in accordance with approval from the user via the user interface element.

In one implementation, the identity of the object is evaluated against an exclusion list. In one implementation, in accordance with a determination that the identity of the object is included on the exclusion list, electronic device 110 refrains from presenting any visual cue corresponding to the object on the display prior to presenting the visual cue on the display.

In one implementation, method 1300 is performed by processing logic, including hardware, firmware, software, or a combination thereof. In one implementation, method 1300 is performed by a processor executing code stored in a non-transitory computer-readable medium (e.g., a memory).

Figure 14:
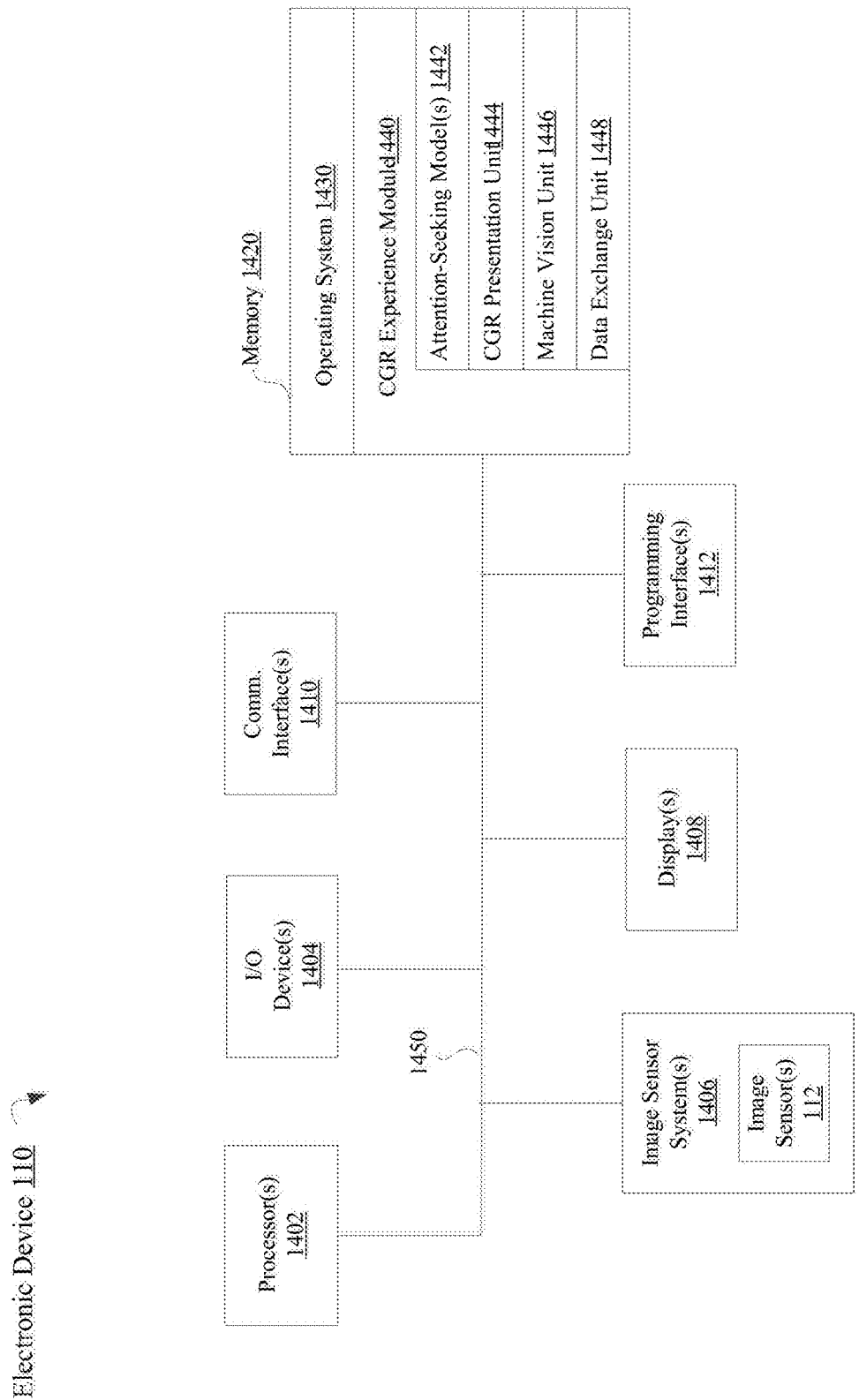
FIG. 14 is a block diagram of an example electronic device that is suitable for some implementations.

FIG. 14 is a block diagram of an example electronic device 110 that is suitable for implementing aspects of the present invention. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations electronic device 110 includes one or more processors 1402 (e.g., microprocessors, ASICs, FPGAs, GPUs, CPUs, processing cores, or the like), one or more I/O devices 1404, one or more interior or exterior facing image sensor systems 1406, one or more displays 1408, one or more communication interfaces 1410 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1412, a memory 1420, and one or more communication buses 1450 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 1404 are configured to provide a human to machine interface exchanging commands, requests, information, data, and the like, between electronic device 110 and a user. The one or more I/O devices 1404 can include, but are not limited to, a keyboard, a pointing device, a microphone, a joystick, and the like.

The one or more image sensor systems 1406 comprise an image sensor (e.g., image sensor 112) configured to obtain content depicting a physical environment in which electronic device 110 is located ("physical content"). In one implementation, the one or more image sensor systems 1106 include an array of image sensors configured to capture light field images corresponding to a physical environment in which electronic device 110 is located. In one implementation, image sensor 112 is disposed on an exterior surface of electronic device 110. Examples of suitable image sensors for effectuating image sensors of the one or more image sensor systems 1406 may include one or more RGB camera (e.g., with a complimentary metal-oxide-semiconductor ("CMOS") image sensor or a charge-coupled device ("CCD") image sensor), monochrome camera, IR camera, event-based camera, or the like.

In some implementations, the one or more image sensor systems 1406 are configured to obtain image data that corresponds to at least a portion of the face of the user that includes the eyes of the user. In various implementations, the one or more image sensor systems 1406 further include illumination sources that emit light upon the portion of the face of the user, such as a flash or a glint source.

In some implementations, the one or more displays 1408 are configured to present content, as described below in greater detail, to the user. In some implementations, the one or more displays 1108 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), or the like display types. In some implementations, the one or more 1408 correspond to diffractive, reflective, polarized, holographic, etc. waveguide displays. In some implementations, the one or more displays 1408 are capable of presenting any combination of physical content and virtual content.

In one implementation, the one or more displays 1408 includes a display device comprising a plurality of pixels and is configured to present content comprising image data obtained using image sensor 112. Each pixel among the plurality of pixels may be implemented using light-emitting diodes (LEDs), organic light-emitting diodes (OLEDs), plasma cells, liquid crystal display (LCD) components, and the like. In one implementation, the one or more displays 1408 are disposed on an inward facing surface of electronic device 110. In one implementation, the one or more displays 1408 are a see-through display through which a portion of the physical environment is visible.

In one implementation, the one or more displays 1408 include a stereoscopic image display for presenting left-eye and right-eye view points. In one implementation, the stereoscopic image display presents a stereoscopic subset of a 3D representation of a scene corresponding to a physical environment (e.g., scene 105 of FIG. 1) in which electronic device 110 is located. In one implementation, the 3D representation of the scene is reconstructed using light field images captured by an array of image sensors included in image sensor system 1406.

The one or more communication interfaces 1410 can include any device or group of devices suitable for establishing a wired or wireless data or telephone connection to one or more networks. Non-limiting examples of a network interface device include an Ethernet network adapter, a modem, or the like. A device can transmit messages as electronic or optical signals.

The one or more programming (e.g., I/O) interfaces 1412 are configured to communicatively couple the one or more I/O devices with other components of electronic device 110. As such, the one or more programming interfaces 1412 are capable of accepting commands or input from a user via the one or more I/O devices 1404 and transmitting the entered input to the one or more processors 1402.

The memory 1420 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 1420 may include high-speed random-access memory, such as DRAM, SRAM, DDR RAM, or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium. Instructions stored in the memory 1420 may be executed by the one or more processors 1402 to perform a variety of methods and operations, including the technique for enriching locally-sourced image data described in greater detail below.

In some implementations, the memory 1420 or the non-transitory computer readable storage medium of the memory 1420 stores the following programs, modules and data structures, or a subset thereof including an optional operating system 1430 and a CGR experience module 1440. The operating system 1430 includes procedures for handling various basic system services and for performing hardware dependent tasks. In some implementations, the CGR experience module 1140 is configured to generate CGR experiences for presentation to a user via the one or more displays 1408. To that end, in various implementations, the CGR experience module 1440 includes attention-seeking model(s) 1442, a CGR presentation unit 1444, a machine vision unit 1446, and a data exchange unit 1448.

In some implementations, the attention-seeking model(s) 1442 is configured to determine whether an object exhibits a characteristic indicative of attention-seeking behavior. In one implementation, the attention-seeking model(s) 1442 is configured to determine whether the object exhibits the characteristic using image data depicting the object that is obtained from image sensor system 1406. To that end, in various implementations, the attention-seeking model(s) 1442 includes instructions or logic therefor, and heuristics and metadata therefor.

In some implementations, the CGR presentation unit 1444 is configured to generate content representing a view of a CGR environment for presentation on the one or more displays 1408. In some implementations, the CGR presentation unit 1444 is configured to present a visual cue on a first portion of a display that corresponds to an object exhibiting a characteristic indicative of attention-seeking behavior without modifying the content presented on a second portion of the display. To that end, in various implementations, the CGR presentation unit 1444 includes instructions or logic therefor, and heuristics and metadata therefor.

In some implementations, the machine vision unit 1446 is configured to perform various image processing techniques (e.g., classification, feature extraction, multi-scale signal analysis, pattern recognition, projection, physical geometry estimation, and the like) on image data received from an image sensor of image sensor system 1406. To that end, in various implementations, the machine vision unit 1446 includes instructions or logic therefor, and heuristics and metadata therefor.

In some implementations, the data exchanging unit 1448 is configured to obtain data (e.g., presentation data, interaction data, sensor data, location data, etc.) from one or more computing devices external to electronic device 110. In some implementations, the data exchanging unit 1448 is configured to transmit data (e.g., presentation data, location data, etc.) to one or more computing devices external to electronic device 110. To those ends, in various implementations, the data transmitting unit 1448 includes instructions or logic therefor, and heuristics and metadata therefor.

Although the attention-seeking model(s) 1442, the CGR presentation unit 1444, the machine vision unit 1446, and the data exchange unit 1448 are shown as residing on a single device (e.g., electronic device 110), it should be understood that in other implementations, any combination of the attention-seeking model(s) 1442, the CGR presentation unit 1444, the machine vision unit 1446, and the data exchange unit 1448 may be located in separate computing devices.

FIG. 14 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 14 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device with a display and an image sensor:
      presenting content representing a view of a computer generated reality (CGR) environment on the display;
      while presenting the content, detecting an object in a physical environment in which the electronic device is located using the image sensor;
      determining an identity of the object based on image data from the image sensor;
      determining, based on the identity of the object, whether the object satisfies exclusion criteria for refraining from displaying the object;

in accordance with a determination that the object satisfies the exclusion criteria for refraining from displaying the object, determining whether the object exhibits a characteristic indicative of attention-seeking behavior; and in accordance with a determination that the object exhibits the characteristic indicative of attention-seeking behavior, overriding the exclusion criteria for refraining from displaying the object and presenting a visual cue corresponding to the object on a first portion of the display without modifying the presentation of the content on a second portion of the display.

2. The method of claim 1, wherein determining whether the object exhibits the characteristic indicative of attention-seeking behavior involves:

applying image data depicting the object as input to a model trained using a dataset of training images depicting particular instances of attention-seeking behavior.

3. The method of claim 2, wherein at least a subset of the dataset of training images is generated by a user of the electronic device using the image sensor.

4. The method of claim 1, wherein determining whether the object exhibits the characteristic indicative of attention-seeking behavior involves:

evaluating image data depicting the object against pre-defined criteria for attention-seeking behavior.

5. The method of claim 4, wherein the pre-defined criteria is obtained from a user of the electronic device.

6. The method of claim 1, wherein determining whether the object exhibits the characteristic indicative of attention-seeking behavior involves:

applying image data depicting the object as input to a gesture recognition process, a pose recognition process, a facial recognition process, or a combination thereof.

7. The method of claim 1, wherein the visual cue is a user interface element overlaying the content on the display that provides a user of the electronic device with information regarding the object.

8. The method of claim 7, wherein the user interface element is operative to overlay a subset of the content presented on the first portion of the display with image data depicting the object that is obtained using the image sensor.

9. The method of claim 1, wherein the visual cue is a wireframe representation of the object that represents peripheral boundaries of the object.

10. The method of claim 1, wherein the visual cue is an image of the object that is obtained from image data generated by the image sensor.

11. A system comprising:
an electronic device with a display and an image sensor;
a processor; and
a computer-readable storage medium comprising instructions that upon execution by the processor cause the system to perform operations, the operations comprising:
presenting content representing a view of a computer generated reality (CGR) environment on the display;
detecting an object in a physical environment in which the electronic device is located using the image sensor while presenting the content on the display;
determining an identity of the object based on image data from the image sensor;
determining, based on the identity of the object, whether the object satisfies exclusion criteria for refraining from displaying the object;
in accordance with a determination that the object satisfies the exclusion criteria for refraining from displaying the object, determining whether the object exhibits a characteristic indicative of attention-seeking behavior; and in accordance with a determination that the object exhibits the characteristic indicative of attention-seeking behavior, overriding the exclusion criteria for refraining from displaying the object and presenting a visual cue corresponding to the object on a first portion of the display without modifying the presentation of the content on a second portion of the display.

12. The system of claim 11, wherein the instructions, when executed, further cause the system to perform additional operations, the additional operations comprising:

evaluating the identity of the object against a priority list.

13. The system of claim 12, wherein presenting the visual cue corresponding to the object is performed automatically in accordance with a determination that the identity of the object is included on the priority list.

14. The system of claim 12, wherein the instructions, when executed, further cause the system to perform additional operations, the additional operations comprising:

in accordance with a determination that the identity of the object is absent from the priority list, presenting a user interface element overlaying the content on the first portion of the display that seeks approval from a user to present the visual cue on the display, wherein the visual cue corresponding to the object is presented further in accordance with approval from the user via the user interface element.

15. The system of claim 12, wherein the instructions, when executed, further cause the system to perform additional operations, the additional operations comprising:

in accordance with a determination that a current position of the electronic device in the physical environment satisfies a geographic restriction associated with the priority list, setting an activation state of the priority list as active.

16. The system of claim 15, wherein:
presenting the visual cue corresponding to the object on the first portion of the display is unaffected by the priority list when the activation state is inactive; and
presenting the visual cue corresponding to the object on the first portion of the display is affected by the priority list when the activation state is active.

17. A system comprising:
an electronic device with a display and a sensor;
a processor; and
a computer-readable storage medium comprising instructions that upon execution by the processor cause the system to perform operations, the operations comprising:
presenting content representing a view of a computer generated reality (CGR) environment on the display;
detecting an object in a physical environment in which the electronic device is located using the sensor while presenting the content on the display;
determining an identity of the object based on image data from the sensor;
determining, based on the identity of the object, whether the object satisfies exclusion criteria for refraining from displaying the object;
in accordance with a determination that the object satisfies the exclusion criteria for refraining from displaying the object, determining whether the object exhibits a characteristic indicative of attention-seeking behavior; and in accordance with a determination that the object exhibits the characteristic indicative of attention-seeking behavior, overriding the exclusion criteria for refraining from displaying the object and presenting a visual cue corresponding to the object on a first portion of the display without modifying the presentation of the content on a second portion of the display.

* * * * *